United States Patent [19]

D'Amelia et al.

[11] Patent Number: 5,240,996

[45] Date of Patent: Aug. 31, 1993

[54] EXTENDED POLYVINYL ALCOHOL ESTERS AS LOW CALORIE FAT MIMETICS

[75] Inventors: Ronald P. D'Amelia, Hicksville, N.Y.; Peter T. Jacklin, Lafayette, N.J.; Lana E. Janes, Weehawken, N.J.; Anthony Scimone, Cedar Grove, N.J.

[73] Assignee: Nabisco, Inc., Parsippany, N.J.

[21] Appl. No.: 865,565

[22] Filed: Apr. 9, 1992

Related U.S. Application Data

[60] Continuation-in-part of Ser. No. 446,220, Dec. 5, 1989, Pat. No. 5,115,017, which is a division of Ser. No. 312,618, Feb. 17, 1989, Pat. No. 4,915,974.

[51] Int. Cl.$^5$ .................. C08F 8/00; C08L 33/06; A23D 7/00
[52] U.S. Cl. .................. 525/59; 525/222; 525/224; 426/611; 426/612
[58] Field of Search .................. 525/59, 222, 224; 426/611, 612

[56] References Cited

U.S. PATENT DOCUMENTS 3,637,774  1/1972  Babayan et al. .
3,876,794  4/1975  Rennhard .

(List continued on next page.)

FOREIGN PATENT DOCUMENTS 205273 12/1986 European Pat. Off. .
235836  9/1987 European Pat. Off. .
236288  9/1987 European Pat. Off. .

OTHER PUBLICATIONS

Babayan, V. K., J. Amer. Oil Chem. Soc. 41, 434–437 (1963).

Bartlett, P. D. and Altschul, R., J. Amer. Chem. Soc. 67, 812–816 and 816–822 (1945).
Dunn, A. S., Chem. & Ind. (London) 801–806, 1980.
Hamm, D. J., Food Sci. 49, 419–428 (1984).
Haumann, B. F., J. Amer. Oil Chem. Soc. 63, 278–288 (1986).

(List continued on next page.)

Primary Examiner—Joseph L. Schofer
Assistant Examiner—Wu C. Cheng

[57] ABSTRACT

Extended polyvinyl alcohol fatty acid esters comprise a new class of edible fat mimetic compounds. These esters, which are, structurally, polyvinyl alcohols having methylene groups between the carbon-carbon backbone and pendant hydroxyl groups that have been partially or fully acylated with fatty acids, are low molecular weight polymers having the following general formula

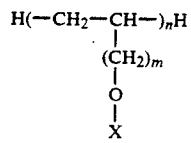

where $N = 5$ to 100,
$m = 1$ to 8, independently,
and X is H or R(CO), R being an aliphatic group having 1 to 29 carbons. Methods of using the new fat mimetics and food compositions incorporating them are disclosed.

21 Claims, No Drawings

U.S. PATENT DOCUMENTS

| | | |
|---|---|---|
| 3,944,680 | 3/1976 | van Pelt et al. . |
| 3,962,465 | 6/1976 | Richter et al. . |
| 3,968,169 | 7/1976 | Selden . |
| 3,986,890 | 10/1976 | Richter et al. . |
| 4,046,874 | 9/1977 | Gabby et al. . |
| 4,247,568 | 1/1981 | Carrington et al. . |
| 4,304,768 | 12/1981 | Staub et al. . |
| 4,504,509 | 3/1985 | Bell et al. . |
| 4,510,166 | 4/1985 | Lenchin et al. . |
| 4,608,265 | 8/1986 | Zwiercan et al. . |
| 4,626,441 | 12/1986 | Wolkstein . |
| 4,631,196 | 12/1986 | Zeller . |
| 4,678,672 | 7/1987 | Dartey et al. . |
| 4,695,475 | 9/1987 | Zwiercan et al. . |
| 4,734,287 | 3/1988 | Singer et al. . |
| 4,797,300 | 1/1989 | Jandacek et al. . |
| 4,849,242 | 7/1989 | Kershner . |
| 4,855,156 | 8/1989 | Singer et al. . |
| 4,915,974 | 4/1990 | D'Amelia et al. ............... 426/611 |
| 4,959,466 | 9/1990 | White . |
| 4,980,191 | 12/1990 | Christensen . |

OTHER PUBLICATIONS

Kwon and Langer, Macromolecules 22, 3250–3255 (1989).

LaBarge, R. G., Food Techn. 42 84–90 (1988).

Leeds, M., Kirk–Othmer Encyclopedia of Chemical Technology, 2nd ed., vol. 21, Wiley–Interscience, New York, 1970, pp. 353–368.

Seymour, R. B. and Carraher, C. E. Polymer Chemistry, Marcel Dekker, New York, 1988 Chapter 9.

Swern, D. and Jordan, E. F., J. Amer. Chem. Soc. 70, 2334–2338 (1948).

Weiss, T. J., et al., J. Amer. Oil Chem. Soc. 48, 145–148 (1971).

EXTENDED POLYVINYL ALCOHOL ESTERS AS LOW CALORIE FAT MIMETICS

RELATED APPLICATIONS

This is a continuation-in-part of application Ser. No. 07/446,220, filed Dec. 5, 1989 U.S. Pat. No. 5,115,017, which is a divisional of Ser. No. 07/312,618 filed Feb. 17, 1989, which issued Apr. 10, 1990 as U.S. Pat. No. 4,915,974.

BACKGROUND OF THE INVENTION

This invention relates to the use of extended polyvinyl alcohol fatty acid esters as fat replacements in edible compositions.

Since fats provide nine calories per gram compared to four calories per gram provided by protein or carbohydrates, major research efforts toward reduction of caloric intake for medical or health reasons have focused on ways to produce food substances that provide the same functional and organoleptic properties as fats, but not the calories. Analogues of natural triglyceride fat, sugar fatty acid polyesters and similar derivatives of other polyhydric compounds, neopentyl alcohol esters, esters of di- and tri-carboxylic acids, jojoba oil, silicone oils and various polysaccharides have been suggested for use as edible fat replacements. (For recent reviews, see Hamm, D. J., 49 *Food Sci.* 419–428 (1984), Haumann, B. F., 63 *J. Amer. Oil Chem. Soc.* 278–288 (1986), and LaBarge, R. G., 42 *Food Tech.* 84–90 (1988).)

In the selection, modification, and/or synthesis of low calorie replacements of edible fats and oils, the polymeric fat replacements, for example, polysaccharides, have a great deal of structural flexibility because of the inherent nature of polymers. Not only may side chain fatty substituents attached to a chemical structure be varied to achieve different chemical and physical properties (as was the case, for example, with the hydrogenated, partially hydrogenated and unhydrogenated fatty acids condensed with sucrose in Eur. Pat. Ap. No. 235,836 to Bodor and Page and in Eur. Pat. Ap. No. 236,288 to Bernhardt to make different sucrose polyesters), but the entire structure may be shortened or lengthened to make macromolecules of enormously differing functionality.

A number of branched and linear polysaccharides and lower molecular weight dextrins and amyloses have been suggested as fat replacements in foods. Polydextrose, a tasteless non-sweet low calorie bulking agent formed by the random polymerization of glucose with lesser amounts of sorbitol and citric acid, has been used as a partial replacement for fat (and sugar) in a variety of common processed foods, including desserts (U.S. Pat. No. 4,626,441), dairy products (U.S. Pat. No. 4,631,196), and crackers (U.S. Pat. No. 4,678,672). Polyglucoses and polymaltoses, prepared by the polycondensation of saccharides in the presence of a polycarboxylic acid catalyst, were synthesized and used in dietetic foods in U.S. Pat. No. 3,876,794 to Rennhard, and combined with dietary fiber in U.S. Pat. No. 4,304,768 to Staub et al.

Converted starches (mostly from tapioca, corn, and potato starches), prepared by the chemical, thermal, or enzymatic degradation of starch molecules to lower molecular weight fragments (including dextrins and amyloses), were disclosed as fat- or oil-replacements in foodstuffs in U.S. Pat. Nos. 3,962,465 and 3,986,890 to Richter et al., U.S. Pat. No. 4,247,568 to Carrington and Haleck, and U.S. Pat. No. 4,510,166 to Lenchin et al. Modified high amylose starches have been employed as fat extenders in imitation cheeses (U.S. Pat. No. 4,504,509, U.S. Pat. No. 4,608,265, and U.S. Pat. No. 4,695,475) and in batter coatings for baked food products that resemble fried foods (U.S. Pat. No. 4,504,509). An anionic polysaccharide obtained from algae was disclosed with mono and/or disaccharides to extend fats in whippable emulsions in U.S. Pat. No. 3,944,680 to van Pelt et al.

Polyglycerol esters comprise another class of polymeric fat replacements. Widely used as emulsifiers, polyglycerol fatty esters are wax-like solids which may be used with hydrophilic colloids to form compositions oleaginous in appearance and texture, but containing substantially no fat. Linear and cyclic polyglycerols of different chain lengths have been prepared for consumption in food (U.S. Pat. No. 3,968,169), and substituted with a range of fatty acid residues (U.S. Pat. No. 3,637,774) for use in margarine, imitation butter, cheese spreads, dips, puddings, icings, salad dressings, sauces, and frozen desserts, including ice cream and sherbet (U.S. Pat. Nos. 3,637,774 and 4,046,874).

More recently, polysiloxanes (Eur. Pat. No. 205,273 to Frye), polyoxyalkylene esters (U.S. Pat. No. 4,849,242 to Kershner), and polymerized $C_{18}$ fatty acid ethyl esters (U.S. Pat. No. 4,980,191 to Christensen) have been suggested.

Though great variations in chain length and structure are possible with some of the currently available polymeric fat substitutes, many are at least partially, if not totally, digestible. (See, for example, Haumann, supra, pp. 278–280, for a discussion of polysaccharides, and Babayan, V. K., 41 *J. Amer. Oil Chem. Soc.* 434–437 (1963), for polyglycerol esters.) See, however, U.S. Pat. No. 4,959,466 to White, which discloses non-digestible partial esters of oligo and polysaccharides. In addition, polymerization reactions are hard to control. The direct free radical polymerization of vinyl esters of unsaturated fatty acids, for example, do not form linear polymers, but polycondense to form cross-linked products (Seymour, R. B., and Carraher, C. E., *Polymer Chemistry*, Marcel Dekker, New York, 1988, chapter 9).

By the same token, degradation reactions are hard to control. Close attention must be made to the conditions under which starches are degraded to form dextrins and sugars (U.S. Pat. No. 4,510,166). Homogeneous products are difficult to achieve, and vary greatly with the starting material used. Even if the starting material were a pure compound, which most natural products are not, the sugar moieties making up polysaccharide chains have myriad functional groups that can react, and geometric and optical isomerism further complicates condensation reactions. (In the esterification of a single sucrose molecule with an excess of fatty acid, for instance, the eight hydroxyl groups can react to form 255 different sucrose esters if all isomers are counted; see Weiss, T. J. et al., 48 *J. Amer. Oil Chem Soc.* 145–148 (1971).)

To circumvent some of these disadvantages, a simpler polymeric fat replacement for food compositions, low molecular weight polyvinyl alcohol esters, was suggested in U.S. Pat. No. 4,915,974 to D'Amelia and Jacklin (herein fully incorporated by reference). Heterogeneity problems resulting from the polymerization or degradation of polysaccharides to form complex mixtures of macromolecules are avoided by using a simple polymeric backbone to which fatty substituents can be attached. Synthetic fats with the different properties (rheology, viscosity, and so forth) needed for different culinary applications can be formulated by varying the degree of substitution and the chain length of the polymer.

SUMMARY OF THE INVENTION

An object of the present invention is to provide another new group of polymeric fat replacements. More particularly, it is an object of the present invention to suggest a restructuring of polyvinyl alcohol esters to further modulate the properties of these fat mimetic compounds.

These and other objects are accomplished by the present invention, which describes edible extended polyvinyl alcohol esters, a new class of edible synthetic fat mimetics, methods of using them, and food compositions incorporating them. These compounds have methylene groups inserted between a polyvinyl alcohol carbon-carbon backbone and pendant hydroxyl groups partially or fully esterified with fatty acids. Edible extended polyvinyl alcohol esters are low molecular weight polymers comprising recurring units having the following general formula:

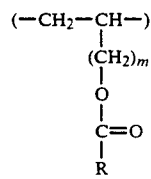

where
m = 1 to 8, independently, and
R is aliphatic group having 1 to 29 carbons.

Preferred extended esters of this invention are molecular weight 500 to 30,000 polymers of the formula

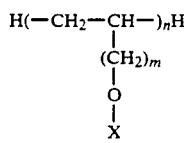

where
n = 5 to 100,
m = 1 to 8, independently,
X is H or R(CO), and
R is as defined above.

DETAILED DESCRIPTION OF THE INVENTION

Polyvinyl alcohol (—CH$_2$—CHOH—)$_n$ is apparently the simplest possible water-soluble polymer. (See recent reviews in Dunn, A. S., 1980 *Chem. & Ind.* (London), 801–806 and Leeds, M., in the *Kirk-Othmer Encyclopedia of Chemical Technology*, 2nd ed., vol. 21, Wiley-Interscience, New York, 1970, pp. 353–368.) Most of its uses involve extrusion of the resin or its application as a surface coating. It has been employed in films, adhesives and binders, and in the treatment of textiles and paper.

Polyvinyl alcohol undergoes chemical reactions very similar to those of low molecular weight aliphatic alcohols. For example, it reacts with acid chlorides or anhydrides to form esters. In many instances, it is possible to obtain a completely new resin by reacting all of the hydroxyl groups. Even with lesser degrees of substitution, the properties of the resin may be considerably altered, while retaining, if desired, the water solubility. Further interesting property variations can be achieved by using partially hydrolyzed polyvinyl alcohol or by varying the chain length of the polymer.

The low molecular weight polyvinyl alcohol esters earlier suggested by us to be edible fat replacements (U.S. Pat. No. 4,915,974 cited above) have the following general formula:

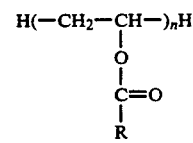

where n is an integer and R is an aliphatic group derived from an organic fatty acid of the formula RCOOH.

We have now found extended polyvinyl alcohol esters have further interesting properties. These compounds have one to eight methylene groups inserted between the polyvinyl backbone and the pendant hydroxyl group, which may be partially or fully esterified with fatty acids. Edible extended polyvinyl alcohol esters are low molecular weight polymers comprising recurring units having the following general formula:

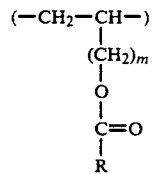

where
m = 1 to 8, independently, and
R is aliphatic group having 1 to 29 carbons.

Preferred extended esters of this invention are molecular weight 500 to 30,000 polymers of the formula

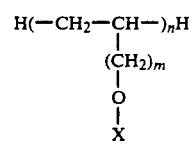

where
n = 5 to 100,
m = 1 to 8, independently,
X is H or R(CO), and
R is as defined above.

Edible extended polyvinyl alcohol esters of this invention can be varied by changing the length of the backbone, the degree of substitution, the complexion of the pendant fatty acid groups, and the number of methylene spacer groups so that the properties of the compounds may be modulated.

Kwon and Langer have reported variations in the properties of pseudopolyamino acids bearing pendant groups of different lengths (22 *Macromolecules* 3250–3255 (1989)). For example, the thermal properties of pseudopolyamino acid esters having shorter pendant groups were amorphous and exhibited an absence of melting transitions up to 300° C. (ibid. at 3253). As the pendant groups became more flexible and longer, differential scanning calorimetry scans indicated that the polymer structure became looser, with increased free volume between the chains, but longer pendant groups reversed the trend, with side chains appearing to stack up (id.). While not wishing to be bound to any theory, this sort of phenomenon might be responsible for the property variations possible on varying the spacer lengths as well as the polymer lengths and nature of the pendant groups in the extended polyvinyl alcohol esters of this invention.

The extended polyvinyl alcohol esters of this invention may be prepared by one of several reaction sequences. One sequence involves the polymerization of an alkene alcohol or alcohols, followed by esterification of the extended polyvinyl alcohol polymer thereby produced with fatty acids or fatty acid derivatives. Where fatty acids are employed in the esterification, the reaction sequence may be described as follows:

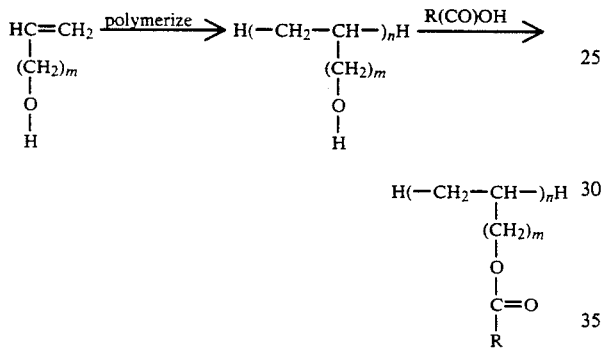

where
 m = 1 to 8, independently,
 n is an integer between 5 and 100, and
 R is an aliphatic group having 1 to 29 carbons.

In a preferred alternative to this synthetic scheme, the alkene alcohol is acetylated prior to polymerization (or a commercially available alkene alcohol acetate is employed). The acetate is polymerized, and then interesterified with fatty acid esters (denominated below as R(CO)OR', where R and R' are aliphatic groups). This variation of the reaction sequence may be described as follows:

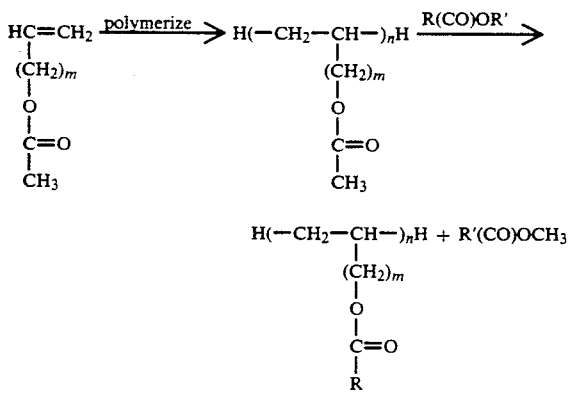

where
 m, n and R are as defined above and

R' is an aliphatic group, preferably having 1 to 4 carbons.

For example, allyl acetate can be polymerized as described by Bartlett, P. D., and Altschul, R., 67 *J. Amer. Chem. Soc.* 812–816 and 816–822 (1945) by heating allyl acetate with acyl peroxides. The polyallyl acetate so produced is then interesterified with a fatty acid ester or esters to form extended polyvinyl alcohol esters of this invention. Where fatty acid methyl esters are employed, the reaction sequence may be summarized as follows:

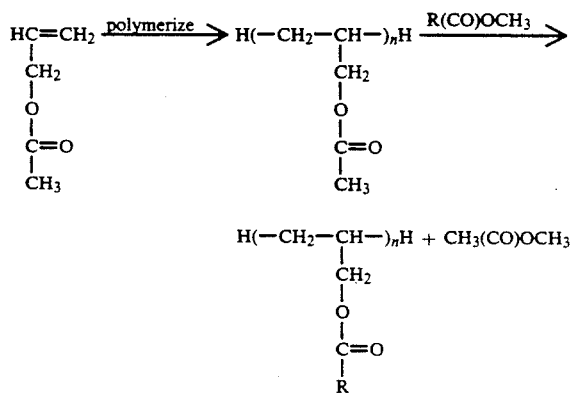

where
 n is an integer between 5 and 20, and
 R is an aliphatic group having 1 to 29 carbons.

Other allyl esters such as propionates, butyrates, and the like may alternatively be polymerized and then interesterified with fatty acid esters as described for the above acetates.

An advantage of this type of reaction sequence is that the polyallyl acetate need not be fully interesterified with fatty acid esters, so that the extended polyvinyl alcohol esters can bear a mixture of pendant acetate and other longer chain groups, yielding compounds with diverse functional properties. An example synthesis is set out in the next section.

Suitable alkene alcohols include those of the formula $CH_2=CH(CH_2)_mOH$, where m is 1 to 8 as defined above. Thus, 2-propen-1-ol (allyl alcohol), 3-buten-1-ol, 4-penten-1-ol, 5-hexen-1-ol, 6-hepten-1-ol, 7-octen-1-ol, 8-nonen-1-ol, and 9-decen-1-ol are suitable for polymerization or, preferably, acetylation followed by polymerization to form an extended polyvinyl alcohol polymer to be further esterified or interesterified with fatty acids or fatty acid derivatives to form the compounds of this invention. Mixtures of alkene alcohols may also be used.

The unsaturated alcohols or alcohol acetates are polymerized using any procedure known to those skilled in the art, such as peroxide-initiated free radical polymerization employing benzoyl peroxide, dibenzoyl peroxide, or the like. The polymerized alkene alcohol or acetate forming the extended polyvinyl alcohol backbone generally has 5 to 100 repeating units.

The polyvinyl alcohol is then esterified with fatty acids or fatty acid derivatives or interesterified with fatty acid esters. The term "fatty acids" used here means organic fatty acids of the formula RCOOH containing two to thirty carbons, and may be synthetic or natural, saturated or unsaturated, with straight or branched chains. Examples of fatty acids include, but are not limited to, acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, docosahexaenoic, and the like acids.

Mixtures of fatty acids may also be used, such as those obtained from non-hydrogenated, partially hydrogenated or fully hydrogenated natural oils, fats or waxes. Typical oils include, but are not limited to, soybean, safflower, sunflower, sesame, peanut, corn, olive, rice bran, canola, babassu nut, coconut, palm, palm kernel, lupin, nasturtium seed, mustard seed, cottonseed, rapeseed, meadowfoam, and marine oils. Fats include lard, tallow and dairy butter. Plant waxes include jojoba. Specific fractions of natural or processed oils, fats, or waxes may also be used.

The term "fatty acid derivative" as used herein means a derivative of a fatty acid. Fatty acid derivatives include fatty acid halides such as chlorides, fatty acid anhydrides, and fatty acid esters. The term "fatty acid ester" as used herein means the methyl, ethyl, propyl, butyl, pentyl, or the like ester of a fatty acid, and any geometric or optical isomer thereof.

Generally, at least about 75% of the R groups contain 1 to 23 carbons (derived from fatty acids having 2 to 24 carbons). In most embodiments, at least 90% of the R groups contain 3 to 23 carbons, particularly 11 to 17, more narrowly, 15 to 17 carbon atoms. Preferred fat mimetics can have an array of R groups selected to include 95% having 13 to 17 carbon atoms (derived from acids having 14 to 18 carbon atoms). In one embodiment, the R groups are predominantly saturated aliphatic groups derived from acids having 1 to 18 carbons. In another embodiment, the R groups are predominantly unsaturated $C_{15}$ to $C_{17}$ groups (with a preponderance of monounsaturated groups derived from oleic acid).

In one reaction sequence, extended polyvinyl alcohol (derived, as described above, from polymerizing an alkene alcohol or alcohols) is condensed with a fatty acid, a fatty acid chloride, or a fatty acid anhydride. The total amount of fatty acid, acid chloride, or anhydride present in the reaction mixture can be a maximum that theoretically will react to completely esterify all the free hydroxyls of the extended polyvinyl alcohol. Thus, the total amount of fatty acid or acid chloride or anhydride present can be one mole for each mole of free hydroxyl moieties available on the extended polyvinyl alcohol reactant. Where substantially full esterification is desired, best results are achieved by using an excess of fatty acid, acid chloride or anhydride. Typically, a 10 to 12 percent excess is employed.

Instead of directly esterifying the extended polyvinyl alcohol polymer, it may instead be transesterified with a fatty acid ester or ester mixture. Theoretically, to achieve full esterification, the total amount of fatty acid ester present in the reaction mixture can be a maximum that theoretically will react to completely transesterify all the hydroxyls of the polyvinyl alcohol reactant. However, best results are achieved with this method by using an excess of fatty acid ester over the theoretical stoichoimetric amount required. Typically, a fifteen percent excess is used. The transesterification can be carried out in the presence of a catalyst, such as, for example, sodium. A sodium/potassium alloy can also be used.

In a particularly preferred embodiment, the unsaturated alcohol is acetylated and then polymerized to form an extended polyvinyl alcohol acetate which is then interesterified with fatty acid methyl esters or ethyl esters in the presence of an interesterification catalyst for such time under such conditions that interesterification occurs.

Thus, esterification of an extended polyvinyl alcohol may be achieved by dissolving the alcohol polymer in fatty acid, acid chloride, or anhydride. Alternatively, the alcohol polymer is dissolved in fatty acid ester and a catalyst is added to the mixture. Alternatively, the unsaturated alcohol acetate is polymerized and then reacted with fatty acid esters. The reaction mixture in any case may be warmed at reflux and stirred to speed the reaction The length of reaction time varies with the reaction conditions and may require several hours.

A solvent may be employed in the reaction. The term "solvent" used in the description and claims means any material that is liquid at the synthesis reaction temperature and pressure and will dissolve, suspend or hold the reactants in the reaction mixture in an amount effective to expedite contact for the desired esterification, transesterification or interesterification to occur.

The extended polyvinyl alcohols need not be fully esterified. As mentioned above, in some embodiments, desirable properties can be achieved with only partial esterification of pendant hydroxyl groups. Thus, many compounds of this invention can be described by the following formula:

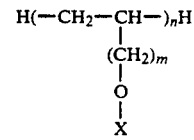

where
m = 1 to 8, independently,
n is an integer between 5 and 100, and
X = H or (CO)—R,
R being an aliphatic group having 1 to 29 carbons.

An advantage of the present invention is that the degree of esterification, the length of the backbone, the length of the spacers, and the nature of the pendant groups can all be independently engineered to obtain different extended polyvinyl alcohol esters having desirable functional properties in diverse food products.

In another reaction sequence, extended polyvinyl alcohol esters bearing saturated pendant fatty acid groups may be prepared by polymerizing esters of long chain aliphatic acids with unsaturated alcohols as described by Swern, D., and Jordan, E. F., 70 *J. Amer. Chem. Soc.* 2334–2339 (1948). This sequence is employed where a fully esterified extended polyvinyl alcohol ester bearing saturated fatty acids is desired. Allyl esters of caproic, caprylic, pelargonic, capric, lauric, myristic, palmitic or stearic acid, for example, can be polymerized with 5% dibenzoyl peroxide to yield low molecular weight extended polyvinyl alcohol esters as follows:

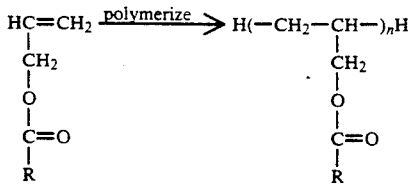

where
n is an integer between 5 and 100, and
R is a saturated $C_5$, $C_7$, $C_8$, $C_9$, $C_{11}$, $C_{13}$, or $C_{15}$ aliphatic group. An example synthesis is set out in the next section The degree of esterification, the lengths of the spacers and the backbones and the nature of the pendant R groups are selected to provide a discernible fatty character in the compounds. Preferred esters are low molecular weight polymers; the polymeric size ranges between molecular weights of about 500 to about 30,000, particularly between about 800 and about 8000, even more narrowly between about 1000 and about 5000. Some extended polyvinyl alcohols are 40 to 60% esterified; others are 61 to 79% esterified; others are 80 to 100% esterified.

When esterified, at least 50%, preferably at least about 75%, of the R groups can contain 1 to 23 carbon atoms (derived from fatty acids having 2 to 24 carbons), more narrowly 11 to 17 carbons (derived from fatty acids having 12 to 18 carbons), even more narrowly 15 to 17 carbon (derived from acids having 16 to 18 carbons). One preferred embodiment has at least about 90% $C_3$ to $C_{23}$ R groups. Another preferred embodiment has an array of R groups selected to include 95% having 13 to 17 carbons (derived from $C_{14}$ to $C_{18}$ acids). One particularly preferred embodiment has predominantly unsaturated $C_{15}$ to $C_{17}$ groups, with a preponderance (i.e., at least about 75%) derived from oleic acid.

The choice, number and arrangement of spacers and pendant groups, and the backbone length, will affect the biological as well as physical properties of the fat mimetics. Preferred compounds deliver 0.5 to 8.5 kcal/gram upon being metabolized, preferably 0.5 to 3.0 kcal/gram. Where, by virtue of any of these factors, fatty groups R are metabolized, the caloric value of the compound will increase. Where an R group is metabolized, it may be a highly desirable or essential fatty acid such as linoleic acid.

The extended polyvinyl esters of this invention may be incorporated either alone, or in combination with another fat and/or fat mimetic, into any food composition or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar ester (such as the sucrose polyester fat replacements disclosed, for example, in Eur. Pat. Ap. Pub. No. 236,288 to Bernhardt and U.S. Pat. No. 4,797,300 to Jandacek and Letton, the disclosures of which are incorporated herein by reference), neoalkyl esters, polyglycerol esters, malonate esters, propoxylated glycerols, retrofats, carboxy/carboxylates, polyvinyl alcohol esters and the like. Also of use in combination with the fat mimetics of this invention are the proteinaceous fat replacements disclosed in U.S. Pat. No. 4,734,287 to Yamamoto and Latella and U.S. Pat. No. 4,855,156 to Singer, et al.,, the disclosures of which are hereby incorporated by reference.

When employed either alone or in products with other fats or fat mimetics, the extended polyvinyl alcohol esters of this invention are desirably added in amounts effective to provide a significant caloric reduction of the calories due to fat. For example, a 10% or greater replacement would be effective for this purpose, and replacements of at least 25%, more particularly 50 to 100%, are desired in many cases. Caloric reductions of at least one third are typical, in many cases reductions of 50% or more are desired.

It is an advantage of this invention that the physical properties of the fat mimetics can be varied over wide ranges by judicious selection of the backbone length, the number of extenders (m), the fatty constituents (R), and the degree of substitution. Formulations for chocolate or confectionery applications, for example, can employ groups or components yielding high-flow-temperature, sharply melting mixtures, salad oils can employ groups or components yielding low to medium-flow temperature mixtures that do not readily crystallize upon refrigeration, margarines and shortenings can employ groups or components yielding plastic mixtures, bakery products may employ groups or components stable to oxidation on storage, and so forth. By flow temperature is meant the temperature at which a one centimeter cube of the material, upon heating and supporting one 0.1 gram weight begins to flow. For purposes of definition, low temperatures will be within the range of up to 40° F., medium flow temperatures are within the range of from 40° to 70° F. and high flow temperatures are above 70°, but preferably below 98° F.

The term "edible material" is broad and includes anything edible, whether or not intended for nutrition, e.g., it can be an additive such as an antioxidant for fats or oils, an antispatter agent, an emulsifier, a texture modifier such as a plasticizer for chewing gum, a component for cosmetics, or other minor functional ingredient such as a carrier or diluent for use in flavorings, pharmaceuticals, and the like.

Broadly speaking, the extended polyvinyl alcohol esters of this invention can be employed as fat replacements in fat-containing edible emulsions comprising an oil phase and an aqueous phase, including those high in fat (e.g., 75 to 85%), such as margarines and salad dressings, and those high in water (e.g., 25 to 75%), such as low fat spreads. The fat mimetics of this invention can be employed as full or partial fat substitutes in dairy, meat, nut, egg, and other food products having a high natural fat component, and in vegetable, cereal and other products having a low natural fat component. The fat mimetics of this invention can be employed as ingredients for all types of leavened baked products, both yeast raised and chemically leavened, and unleavened baked products, and as coatings or coating ingredients for the same types of products. The fat mimetics of this invention can be employed as an ingredient or a coating for snack food products, as well as a frying oil or a frying oil ingredient for fried snacks. In addition, the low calorie fat mimetics of the present invention can be employed to form edible barrier layers, either on the exposed surfaces of foods or as internal barrier layers used to separate various portions of a food product, e.g., as a barrier between a dessert filling and an outer edible shell.

Representative of fat-containing food products which can contain, in addition to other food ingredients, the extended polyvinyl alcohol esters of this invention in full or partial replacement of natural or synthetic fat are: frozen desserts, e.g., frozen novelties, ice cream, sherbet, ices, and milk shakes; salad dressings; mayonnaises and mustards; dairy and non-dairy cheese spreads; margarine, margarine substitutes and blends; flavored dips; flavored bread or biscuit spreads; filled dairy products such as filled cream and filled milk; frying fats and oils; cocoa butter replacements and blends; candy, especially fatty candies such as those containing peanut butter or chocolate (to which antibloom properties may be imparted); reformed and comminuted meats; meat substitutes and extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and mixes or ingredient premixes for any of these. The low calorie fat mimetics of this invention may also be employed in any flavor, nutrient, drug or functional additive delivery system.

Exemplary food products which can be improved by the use of the extended polyvinyl alcohol esters of this invention are: baked foods, such as cookies, crackers, biscuits, cakes and the like which all contain at least a flour or starch component in addition to the low calorie fat mimetics of this invention; snack products which are fried or coated with fat or oil and/or also contain at least a flour or starch component in addition to the low calorie fat mimetics; emulsion products, such as margarine products (e.g., full-fat, low-fat, and fat substitute products), salad dressing and mayonnaise which all contain emulsions having a fat phase including the low calorie fat mimetics and an aqueous phase; candies and confections which contain a sweetener such as sugar or aspartame in addition to the low-calorie fat mimetics; and dairy product substitutes which contain a dairy protein such as whey, casein or caseinate, or the like in addition to the low calorie fat mimetics. The margarine products also typically contain a milk component and butter flavor, while the salad dressings will contain spices and the mayonnaise, egg. Among the baked products, cakes and cookies also contain sweeteners and the crackers typically contain salt.

In one of its broad aspects, the invention provides a process for preparing a food product with reduced calories comprising adding a fat mimetic of the invention to at least one other food ingredient in the preparation of the food. The fat mimetic can be in total or partial substitution of the normal or natural fat content. Typical food ingredients will be selected from the group consisting of protein, carbohydrates, fats, nutrients, and flavors. These ingredients are typically added in the form of flours, meals, fruits, dried fruits, vegetables, dried vegetables, meats, dried meats, starches, spices, salt, dried milk solids, sugars, acidulents, buffers, emulsifiers, stabilizers, gums, hydrophilic colloids, salts, antioxidants, colors, preservatives and the like. The fat mimetic will typically be employed in an amount of at least 5%, e.g., from 10 to 90% of the composition and one or more other food ingredients will be present at 10 to 90%. More specific ranges, appropriate for various products, are given in the Examples.

It is a further advantage of the invention that desirable physical properties can be achieved in foods containing high concentrations of naturally-occurring cis monounsaturates by blending the fat mimetics with oils rich in these, such as corn, soybean, canola, peanut, and cottonseed oils, and tallow, lard, and mixtures and fractions of these. Alternatively, it is possible to employ fatty acids or mixtures of fatty acids from fractions of one or more of these oils.

In one embodiment, the low calorie fat mimetics of this invention are mixed with natural oils such that the ratio of unsaturated to saturated residues in the resulting blend lies between 1 and 10, more narrowly between 2 and 6, and even more narrowly between 3 and 5. In one embodiment, the polyunsaturated to saturated ratio is above 10; in another, between 10 and 25. Additionally, this ratio can be increased even more by blending the fat mimetic with a highly polyunsaturated oil such as safflower, sunflower, sorghum, soybean, peanut, corn, cottonseed and sesame oils.

EXAMPLES

The following examples detail methods of preparing extended polyvinyl fatty acid esters in accordance with the present invention and some compound uses in food compositions. It is to be understood that these examples are merely illustrative and are not to be construed as being limitative. Unless otherwise indicated, all percentages given are weight percentages, and are based on the weight at the particular stage of processing described.

EXAMPLE 1

To a 10-ml reaction flask equipped with a reflux condenser, stirrer, and oil bath is added 3.24 g of 4-penten-1-yl acetate (98%, Aldrich Chemicals) and a catalytic amount of benzoyl peroxide (97%, Aldrich Chemicals). The reaction is allowed to stir under nitrogen at 130° to 150° C. for 4 hours during which time color change from water white to a deep brown liquid is noted.

The reaction mixture is then distilled using a short path distillation apparatus at 160° C., <1 mm Hg for 4 hours to separate the polymer from unreacted monomer. This produced a dark brown viscous material which nuclear magnetic resonance spectroscopy showed to be a low molecular weight polymer of the starting material formed in the reaction:

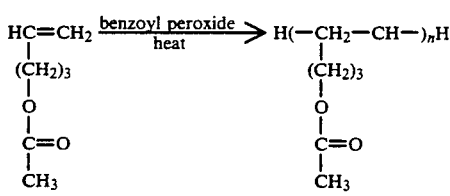

where n is an integer.

Interesterification of the polymer with methyl oleate is then carried out in a 10-mL round bottom flask equipped with a stirrer, oil bath, vigreux column, vacuum pump, and two external liquid nitrogen traps to isolate the methyl acetate side product. Reactants are heated to 115° C. prior to addition of the base catalyst, sodium methoxide. The mixture turned a reddish brown color during the two hours of reaction time. Upon completion of the reaction, the base catalyst is quenched with phosphoric acid (85%) during cooling, yielding a dark brown liquid oil at room temperature.

The final product, which can be described by the following formula:

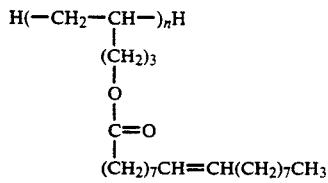

where n is an integer, is isolated from unreacted methyl oleate by a short path vacuum distillation at 200° C., <1 mm Hg, producing 0.99 g of a dark brown oil.

EXAMPLE 2

In this example, an extended polyvinyl alcohol ester fat mimetic, polyallyl stearate, is prepared by polymerizing allyl fatty acid esters as described by Swern and Jordan, cited above.

Allyl stearate is first prepared. A pure commercial grade allyl alcohol is distilled through an efficient fractionating column and then employed in a condensation with a 100% molar excess of stearic acid using 1 to 2% naphthalene-2-sulfonic acid (based on stearic acid) as catalyst and benzene as an entraining agent to remove the water formed during the reaction. About three to six hours are required to obtain the theoretical quantity of water. The esters are isolated from the reaction mixture by recrystallizing to a constant melting point from acetone (3 to 4 mL of solvent per gram of solute) after recovery of the unreacted alcohol. The product is purified by recrystallization from acetone at −20° and 0° C., respectively, to give an 85% yield of allyl stearate having a melting point of 35° to 36° C.

To a 5-ml portion of recrystallized allyl stearate is added 0.5% benzoyl peroxide and the polymerization is conducted in a thermostatically controlled oven. A limited amount of solid product is formed.

EXAMPLE 3

In this example, polyallyl oleate is prepared by transesterifying polyallyl acetate with methyl oleate.

Polyallyl acetate is prepared as described by Bartlett and Altschul, cited above. A 500-mL reaction flask equipped with a thermometer, stirrer, and reflux condenser is charged with 1.5 moles (102 mL) of allyl alcohol, 0.75 mole (71 mL) of acetic anhydride, and 1.5 moles (86 mL) acetic acid. Five mL concentrated sulfuric is added and the mixture heated under reflux for two hours. The mixture is poured slowly with stirring into ice water, and extracted with ice-cold sodium carbonate and cold saturated calcium chloride solutions. After drying with 12 g. of anhydrous potassium carbonate, the ester is distilled twice through an all-glass apparatus in a stream of nitrogen. The middle fractions only are collected to yield a product having a boiling point (124–126 mm) of 53.2° to 54° C. Using the method of Bartlett and Altschul, the polymer had an average of about 13 monomer units. The polymer is interesterified with methyl oleate as described in Example 1 above and purified to obtain polyallyl oleate.

EXAMPLE 4

Chocolate Chip Cookies. Reduced calorie crisp chocolate chip cookies may be prepared by blending

|  | parts |
| --- | --- |
| Flour | 22.0 |
| Example 3 Fat Mimetic | 20.0 |
| Salt | 0.7 |
| Sodium Bicarbonate | 0.1 |
| Monocalcium Phosphate | 0.1 |
| Vanillin | 0.1 |
| Water | 8.0 |
| To this is added | |
| Sugar | 30.0 |
| which is mixed until dispersed. Then | |
| Chocolate Chips | 19.0 | are added and mixed until just blended prior to depositing and baking in the usual process.

EXAMPLE 5

Chewy Chocolate Chip Cookies. Chewy chocolate chip cookies may be prepared by combining

|  | parts |
| --- | --- |
| Sugar | 24.3 |
| Invert Sugar | 20.0 |
| Flour | 13.7 |
| Example 1 Fat Mimetic | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |
| To this is added | |
| Chocolate Chips | 19.0 | and mixed until just dispersed prior to depositing and baking in the usual process.

EXAMPLE 6

Sandwich Cookies. A basecake may be prepared by combining

| Ingredient | parts |
| --- | --- |
| Flour | 48.0 |
| High Fructose Corn Syrup | 12.0 |
| Sugar (6X) | 10.0 |
| Example 1 Fat Mimetic | 10.0 |
| Dutched Cocoa | 5.0 |
| Corn Syrup (42 D.E.) | 3.0 |
| Dextrose | 2.0 |
| Frozen Whole Eggs | 2.0 |
| Salt | 0.3 |
| Sodium Bicarbonate | 0.2 |
| Lecithin | 0.2 |
| Vanillin | 0.2 |
| Ammonium Bicarbonate | 0.1 |
| Water | 7.0 | mixing well, rotary molding, baking and cooling. A filler may be prepared by melting

| Example 2 Fat Mimetic | 37.0 |
| --- | --- |
| and adding | |
| Sugar 10X | 62.7 |
| Vanillin | 0.3 |

Cool filter to 78° C. and sandwich between base cakes in a ratio of 1 to 3.

EXAMPLE 7

Vanilla Wafers. Vanilla wafers may be prepared by combining and mixing well

|  | parts |
| --- | --- |
| Flour | 40.0 |
| Sugar (10X) | 28.0 |
| Example 3 Fat Mimetic | 13.0 |
| Frozen Whole Eggs | 6.0 |
| High Fructose Corn Syrup | 4.0 |
| Salt | 0.7 |
| Vanillin | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 8

Soda Crackers. Soda crackers may be prepared by pre-mixing ¼ of

|  | parts |
| --- | --- |
| Flour | 70.0 |
| Yeast | 0.2 | and sufficient water to make a dough. This is fermented for 24 hours. The remaining flour, enough water to make the total

|  |  |
| --- | --- |
| Water | 20.0 |
| Malt Syrup | 0.69 |
| Sodium Bicarbonate | 0.40 |
| Malt | 0.01 | are added and mixed well, the ferment added and mixed again. This is proofed for 8 hours, sheeted, and baked. Afterwards,

|  |  |
| --- | --- |
| Example 2 Fat Mimetic is applied to the crackers with | 7.0 |
| Salt | 1.7 | prior to packaging.

EXAMPLE 9

Sprayed Crackers. A dough prepared from

|  | parts |
| --- | --- |
| Flour | 100 |
| Sugar | 5.0 |
| Malt | 1.5 |
| Fat Mimetic of Example 1 | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product, then sprayed with Fat Mimetic of Example 2 prior to packaging.

The above descriptions are for the purpose of disclosing to a person skilled in the art how to practice the present invention. These are not intended to detail all the obvious modifications and variations of the invention which become apparent upon reading. However, applicants do intend to include all such obvious modifications and variations within the scope of their invention which is defined by the following claims.

What is claimed is:

1. A food composition comprising, as a fat mimetic ingredient, a molecular weight 500 to 30,000 extended polyvinyl alcohol ester polymer of the formula:

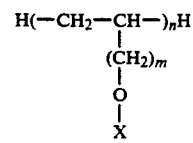

where
m = 1 to 8, independently,
n = 5 to 100,
X is H or R(CO), and
R is an aliphatic group having 1 to 29 carbons.

2. A composition according to claim 1 wherein all the X groups are R(CO) and at least 90% of the R groups have 3 to 23 carbon atoms.

3. A composition according to claim 2 wherein the fat mimetic is employed in an amount of at least 5% by weight of the composition.

4. A composition according to claim 2 wherein said food composition is a bakery product and further comprises flour or starch.

5. A composition according to claim 2 wherein said food composition is a candy and further comprises a sweetener.

6. A composition according to claim 2 wherein said food composition is a snack product and further comprises starch or flour.

7. A composition according to claim 2 wherein said food composition is an emulsion comprising an aqueous phase and a fat phase including the fat mimetic.

8. A composition according to claim 2 which further comprises a proteinaceous fat replacement.

9. A composition according to claim 2 which further comprises a sucrose polyester fat replacement.

10. An edible synthetic fat replacement composition comprising polymerized alkene alcohols selected from the group consisting of 2-propen-1-ol, 3-buten-1-ol, 4-penten-1-ol, 5-hexen-1-ol, 6-hepten-1-ol, 7-octen-1-ol, 8-nonen-1-ol, 9-decen-1-ol, and mixtures of these esterified with $C_2$ to $C_{24}$ fatty acids.

11. A composition according to claim 10 wherein the polymerized alkene alcohol is 2-propen-1-ol.

12. A composition according to claim 10 wherein the polymerized alkene alcohol is 4-penten-1-ol.

13. A composition according to claim 10 wherein said polymerized alkene alcohol esterified with fatty acids has a molecular weight of about 800 to about 8000.

14. A composition according to claim 13 wherein said polymerized alkene alcohol esterified with fatty acids has a molecular weight of about 1000 to about 5000.

15. In a food composition having a fat ingredient, an improvement wherein a fat mimetic polymer of the formula,

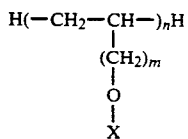

where m = 1 to 8, independently, n is an integer between 5 and 100, and

X is H or (CO)R,

R being an aliphatic group having 1 to 29 carbons, is employed in partial or full replacement of said fat ingredient.

16. An improvement according to claim 15 wherein said fat mimetic polymer is employed as a fat replacement for at least 10% of said fat ingredient.

17. An improvement according to claim 16 wherein said fat mimetic polymer is employed as a fat replacement for at least 25% of said fat ingredient.

18. An improvement according to claim 15 wherein $m = 1$.

19. An improvement according to claim 15 wherein $m = 3$ and X is an oleic acid residue.

20. An improvement according to claim 15 wherein said fat mimetic polymer is derived from polyallyl acetate.

21. A food composition comprising, as a fat mimetic ingredient, an extended polyvinyl alcohol ester polymer obtained by
 (a) polymerizing 4-penten-1-yl acetate with a catalytic amount of benzoyl peroxide under nitrogen;
 (b) distilling the polymerized acetate to remove unreacted 4-penten-1-yl acetate starting material;
 (c) interesterifying the polymerized acetate with methyl oleate in the presence of sodium methoxide to obtain the extended polyvinyl alcohol ester polymer; and
 (d) purifying the extended polyvinyl alcohol ester polymer.

* * * * *